(No Model.) 3 Sheets—Sheet 1.

H. D. COFFEY.
WEIGHING SCALE.

No. 318,451. Patented May 26, 1885.

WITNESSES
G. W. Knott
E. A. Martin

INVENTOR
H. D. Coffey
By His Atty
J. N. Adriaans (No Model.)

3 Sheets—Sheet 2.

H. D. COFFEY.
WEIGHING SCALE.

No. 318,451. Patented May 26, 1885.

WITNESSES
INVENTOR (No Model.)   3 Sheets—Sheet 3.

H. D. COFFEY.
WEIGHING SCALE.

No. 318,451.   Patented May 26, 1885.

WITNESSES
E. A. Martin
G. W. Knott

INVENTOR.
H. D. Coffey
By His Atty.
J. N. Adriaans

UNITED STATES PATENT OFFICE.

HENRY DAVIS COFFEY, OF MASSIE'S MILLS, VIRGINIA, ASSIGNOR OF ONE-THIRD TO LYSANDER N. MILLER, OF SAME PLACE.

WEIGHING-SCALE.

SPECIFICATION forming part of Letters Patent No. 318,451, dated May 26, 1885.

Application filed June 13, 1884. (No model.)

*To all whom it may concern:*

Be it known that I, HENRY DAVIS COFFEY, of Massie's Mills, in the county of Nelson and State of Virginia, have invented certain new and useful Improvements in Scales; and I do hereby declare that the following is a full, clear, and exact description thereof, reference being had to the accompanying drawings, and to the letters of reference marked thereon, which form part of this specification.

My invention relates to improvements in scales; and the objects thereof are, first, to provide a device sensitive as well to the least as to the greatest weight; second, to indicate or record the weight of any substance automatically; third, to decrease the friction and hence enhance the indicating-power of the scale; fourth, to provide means whereby the scale shall be affected notwithstanding the substance is placed in different locations simultaneously or periodically, and, fifth, to effect these ends with the maximum simplicity of construction. I attain these objects by the mechanism illustrated in the accompanying drawings, in which—

Figure 1:
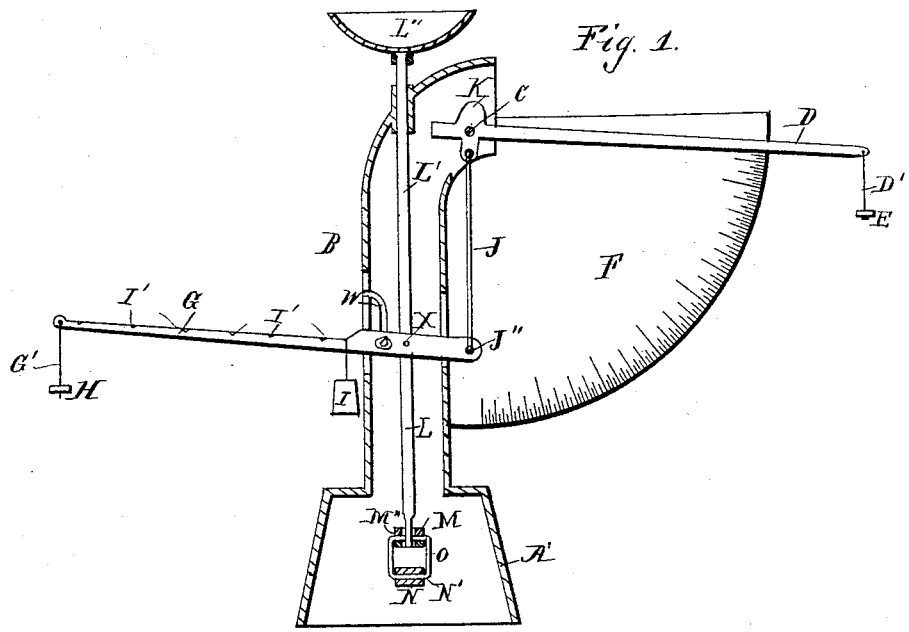
Figure 2:
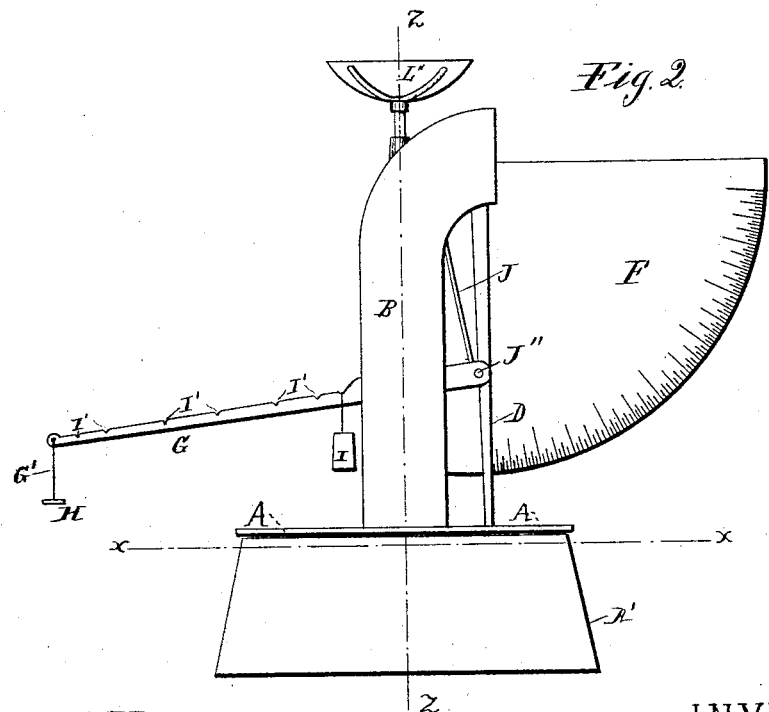
Figure 3:
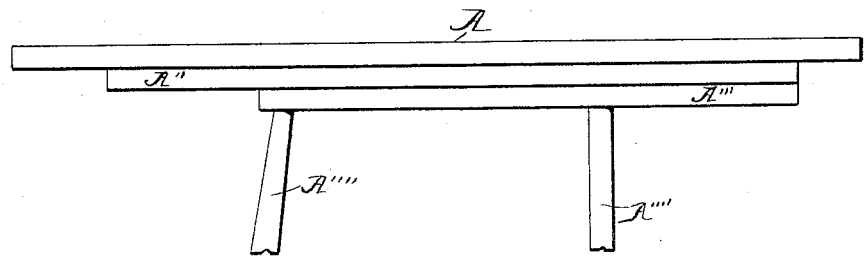
Figure 4:
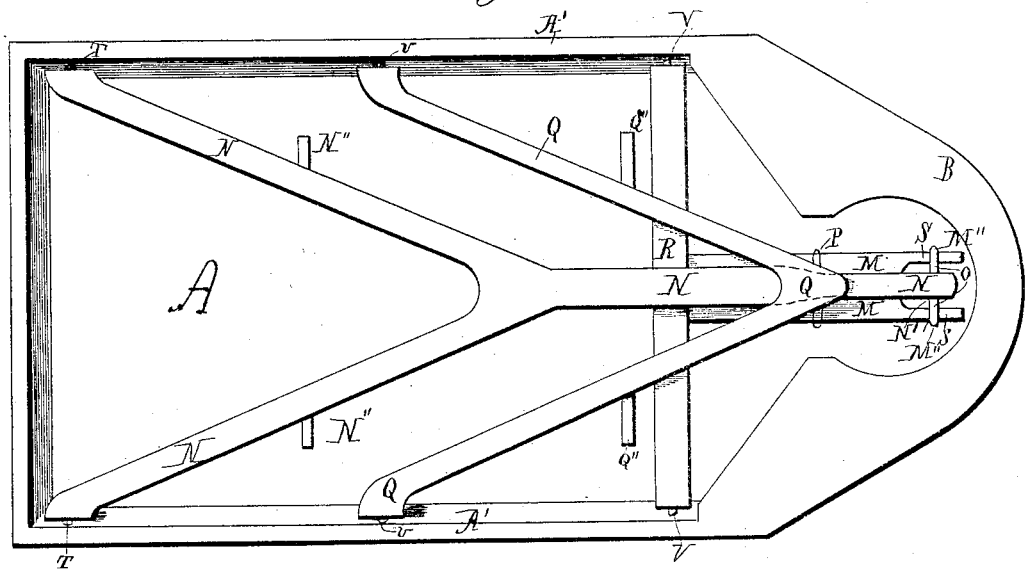
Figure 5:
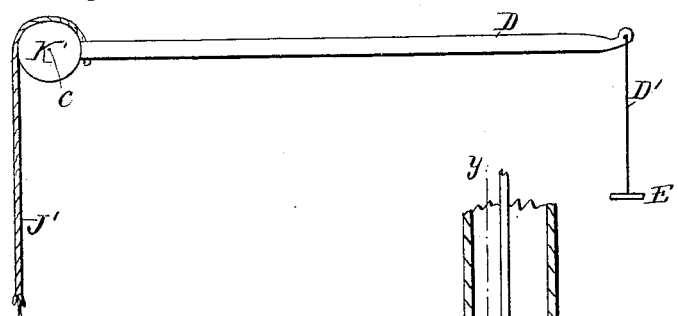
Figure 6:
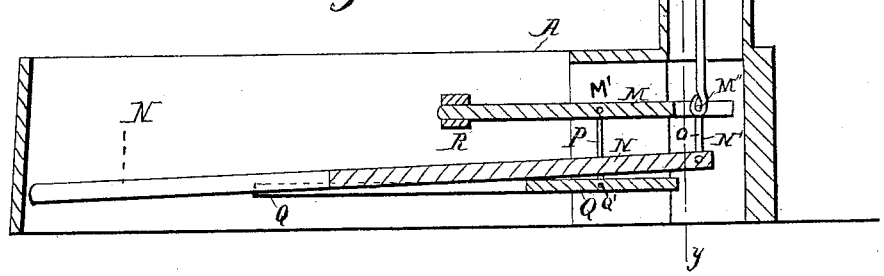
Figure 7:
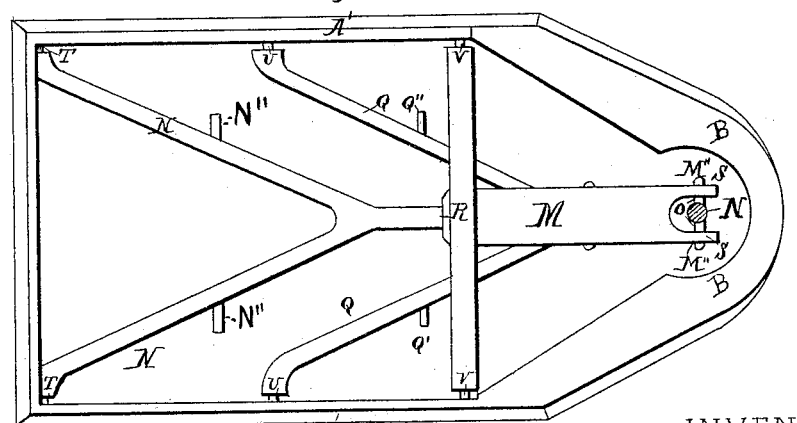

Figure 1 is a vertical section of a machine operatively showing my several improvements, taken on line $yy$ of Fig. 6. Fig. 2 is an elevation of the same. Fig. 3 is an elevation of the detached platform. Fig. 4 is a plan view of the machine, looking from the bottom. Fig. 5 is a detached view of a modification of part of my invention, whereby the dead-center of the bell-crank normally operating the indicating-lever is overcome and a rolling motion produced. Fig. 6 is a vertical section taken on the line $zz$ of Fig. 2. Fig. 7 is a horizontal section on the line $xx$ of Fig. 2.

The same letters indicate the same parts in all the views.

A is the platform, on which large articles or bulky substances can be placed in order to test their weight.

A' is the frame which the platform operates.

A'' A''' are portions cut away from the inner side of the platform to adapt it to the frame.

A'''' are legs.

B is an upright, which incloses the connecting-bar L and guides the reciprocation of the scale-pan L''.

C is the pivot on which the bell-crank K is secured.

D is the indicating arm or lever, integral with the bell-crank, and which, moving automatically in a graduated arc, F, determines the weight of the substance in the pan L'' or on the platform A, or both. The graduations on the arc F are always the same, but different values must be attributed to them according to the conditions, which vary, as hereinafter explained.

E is a weight suspended from a cord or lever, D', whose absence, presence, or amount serves to vary the value of the graduations on the arc F.

G is a lever pivoted on the arm W. Its short arm is actuated by the weight of the substance transmitted through the lever L. The extremity of the short arm is flexibly or rigidly connected with the lever D, according as the bell-crank K and connecting-bar J or the roller K' and flexible coupling J' are used.

From the extremity of the long arm a weight, H, is suspended from a cord or lever, G', whose measure affects the value of the graduations on the arc F. The long arm is also notched at I' I' I' to accommodate a weight, I. These indentations indicate a hundred, five hundred, a thousand, five thousand, &c., according to the character of use demanded of the machine and the inclination of the owner. These values may be entirely mental, and thus changed at pleasure.

J is a rod affixed at one end to the short arm of the lever G at J'' and at the other end to the bell-crank K, which transmits any motion imparted by the weight of a substance to the indicating-lever D. Fig. 5 illustrates a modification of this feature of my invention. Sometimes a very delicate weight is to be determined, and it is found that the dead-center of the bell-crank K impedes the indications or affects the accuracy thereof. In those cases an obtuse-angled bell-crank or a conical roller, K', preferably of steel, is substituted for the right-angled bell-crank K, and manipulated similarly by a flexible connection, J', affixed to the inner termini of the arms of the levers G and D. This roller K' should differ infinitesimally from a true circle, approximating an oblate spheroid at any plane cutting the surface at right angles.

L is a rod connecting lever M with lever G at the point X.

L' is a continuation of the rod L, and performs the same function of transmitting weight for the scale-pan L" as the lever L does for the platform A.

M is a lever pivotally secured in the frame A' by means of cross-bar R, which serves to transmit the motion imparted by the substance pressing on the pins Q" Q" to the lever L, and thence to the indicating mechanism. This function of the lever M is secured through connecting levers M and Q by link P, whose ends are passed through perforations M' Q', respectively, in the two levers.

N is a lever pivotally secured in the frame A' by pins T T, and bifurcated rearwardly. The point of divergence is located at one-half the length (in a straight line) of the lever, and the pins N" N", which receive the pressure of the weight of the substance on the platform, are placed at one-half the length of each diverging arm, or one-fourth the entire length (in a straight line) of the lever N.

O is the link connecting the levers M and N. The ends pass through holes M" N', respectively, therein.

P is a similar link, uniting the levers M and Q, its ends being inserted securely in the perforations M' Q' in the respective levers.

Q is a lever whose diverging arms are secured pivotally by pins V V in the frame A'. Pins Q" Q", receiving the pressure imparted by the weight of the substance on the platform, by reason of the forward legs, A"" A"", resting thereupon, are located at points one-half the length of the arms, and the forward portion of the lever is connected by link P to lever M at a point one-half the length of the latter lever.

R is a cross-bar pivotally secured in the frame A' by pins V V, sustaining one end of the lever M, and thus permitting its oscillation.

S S are the arms of the lever M, which form a yoke to support the end of the lever N and the bottom of the rod L, which are all joined by link O, whose ends are passed through holes M" M" N' N' in the respective levers, and whose central top portion is grasped by the hooked end of the rod L, so that the latter instantaneously obeys any impulse of any of the levers M N Q, and registers it, through the medium of the levers G D, connecting-bar J, and bell-crank K, on the graduated arc F. It is plain that if the lever G is actuated by the pulling action of the lever L it would be equally affected by the pushing action of lever L' imparted by weight in the scale-pan L."

It will now be understood that by means of this mechanism a merchant may use this scale to indicate ounces, pounds, and hundreds and thousands of pounds without necessitating other adjustment than to place corresponding weights E H in position and move the weight I along the notches. Otherwise than this manipulation the indication is entirely automatic, and that whether articles are weighed in the scale-pan L" or on the platform A. For example, this scale is designed to weigh ounces and fractions thereof, as denoted by the divisions on the arc F, without any weight E, whether the article to be weighed be in the pan L" or on the platform A; but if a pound-weight be used at E, the same divisions denote quarter-pounds, and with the addition of more weight these divisions would signify pounds, four pounds, &c. Similar variable values may be attributed to the graduations by decreasing or diminishing weight H. The variable location of the weight I does not affect the value of the graduations otherwise than by the mere addition of the amount indicated by the notch I' to the sum indicated by the graduation on arc F. Thus by properly recognizing the value of the graduations under the varying conditions, one may fill an order for a thousand pounds of sugar by adding to a sack or box found lacking on the platform so much in the pan as is necessary to supply the deficiency; or one may use the same scale at one time to weigh his wholesale and at another time his retail wares, if he should happen to be willing to do that; or from the same scale a merchant may find the suitable proportions of different grades of a substance that he desires to mix by giving to the graduations the factitious values secured by the addition of weights. It is also observable that the indication is entirely automatic, after adapting the conditions to the circumstances.

It is a prominent feature of this invention, moreover, that all the levers M N Q pitch forward—that is, they are all pivoted rearwardly, and hence all work forwardly—which numerous experiments have convinced me is the most sensitive position they are capable of. This dispenses with unnecessary friction, and materially increases, under equal conditions, the relative life of the machine.

The operation is as follows: The bifurcated lever Q is secured in the frame A' by pins V V. Then a similar lever, N, is superposed thereover and similarly secured in the frame by pins T T. The pins N" N" Q" Q" have previously been properly located. Finally, the lever M is pivotally placed over both by means of cross-bar R and pins V V. The levers M Q and M N are then respectively joined rearwardly by links P O. The hooked end of the rod L is then passed under the link O, and thus the rod L will move synchronously with all the levers M N Q and the links O P when pressed by a weight. This motion is transmitted to the short arm of a lever, G, pivoted on a knife-edge on the arm W by means of the connecting-pin X and participated in by the rod J, terminally secured at J", and one arm of a bell-crank lever, K. The motion of the bell-crank is identical with that of the indicator D, so that the amount of oscillation of the former is denoted on the arc F by the latter, and this, of course, is the weight of the article in the pan or on the platform.

All pivots and bearings may be made to work on knife-edges, thereby destroying most of the insignificant friction otherwise encountered.

Having thus fully described my invention, what I claim, and desire to secure by Letters Patent of the United States, is—

1. The combination, with a platform-scale, of two indicating-levers pointing in different but parallel directions, a graduated arc, and means, substantially as shown, for varying the value of the graduations.

2. The platform pressure-transmitting levers M N Q, terminally provided with pins, the said levers being so pivoted that they operate forwardly, and the last two, N N Q Q, of the series so disposed as to deposit their entire pressure on the lever M, thereby actuating the same, in combination with the rod L and the mechanism, substantially as shown, for affecting it synchronously with the impulses of the said transmitting-levers.

3. In a platform-scale, the rod L, integral with rod L', operated, respectively, by the platform and the pan, in combination with the graduated arc F, the indicator D, and flexible connection J, the latter being mediately united at one end to the rod and at the other to the indicator, whereby variable impulses imparted by differing pressures in the pan or on the platform may be correctly indicated.

4. The pan L'', in combination with the rod L', lever G, pivoted as described, pin X, connection J, bell-crank K, indicating-lever D, pivoted as shown, and graduated arc F.

5. The rod L, actuated as described, in combination with the lever G, pivoted as illustrated, notched at I' I', poise I, weight H, suspension-bar G', arm W, pin X, connection J, bell-crank K, indicator D, pivoted as shown, weight E, suspension-bar D', and graduated arc F.

6. The levers M N Q, having pins N'' N'' Q'' Q'', located as described with respect to said levers, in combination with the platform A, having legs A'''' A'''', arc F, the means, substantially as shown, for transmitting the pressure on said platform, and the levers G D, for indicating the same.

7. The levers M N Q, pivotally secured as herein described, having pins N'' N'' Q'' Q'', located as specified, in combination with the platform A, having legs A'''' A'''', the links O P, the rod L L', the levers G D, connected and adjusted as illustrated, and graduated arc F, the whole co-operating in the relation, for the purpose, and by the means herein fully shown and described.

In testimony that I claim the foregoing as my own I affix my signature in presence of two witnesses.

HENRY DAVIS COFFEY.

Witnesses:
JOHN COFFEY,
WILLIS P. HATTER.